(12) United States Patent
Toelken

(10) Patent No.: US 7,707,973 B2
(45) Date of Patent: May 4, 2010

(54) HANDHELD EXAMINATION HOLDER FOR AVIAN HATCHLINGS, AND GENDER EXAMINATION PROCESS

(75) Inventor: L. Taizo Toelken, Skidmore, TX (US)

(73) Assignee: Ultra-Hatch, Inc., Skidmore, TX (US)

( * ) Notice: Subject to any disclaimer, the term of this patent is extended or adjusted under 35 U.S.C. 154(b) by 813 days.

(21) Appl. No.: 11/635,377

(22) Filed: Dec. 7, 2006

(65) Prior Publication Data

US 2007/0186869 A1  Aug. 16, 2007

Related U.S. Application Data

(60) Provisional application No. 60/750,273, filed on Dec. 13, 2005.

(51) Int. Cl.
*A01K 37/00* (2006.01)
(52) U.S. Cl. .............. 119/713; 600/443; 119/712; 119/716; 382/110
(58) Field of Classification Search ......... 119/713, 119/717, 6.8, 174
See application file for complete search history.

(56) References Cited

U.S. PATENT DOCUMENTS

| | | | | |
|---|---|---|---|---|
| 3,994,292 A * | 11/1976 | Goodwin | ............. | 128/200.14 |
| 5,438,960 A * | 8/1995 | Roosenboom | ............. | 119/713 |
| 6,396,938 B1 * | 5/2002 | Tao et al. | ............. | 382/110 |
| 6,512,839 B1 | 1/2003 | Toelken | ............. | 382/110 |
| 6,805,244 B1 * | 10/2004 | Toelken | ............. | 209/510 |
| 7,004,112 B2 * | 2/2006 | Gorans | ............. | 119/713 |
| 7,354,401 B1 * | 4/2008 | Toelken | ............. | 600/443 |

* cited by examiner

*Primary Examiner*—Marvin M Lateef
*Assistant Examiner*—Joshua Huson
(74) *Attorney, Agent, or Firm*—Jonathan A. Bay

(57) ABSTRACT

A handheld, hatchling holder not only simplifies manual examinations but also better protects the hatchling's welfare. The welfare concerns include not only bruising but also yolk-sac rupture. The handheld, hatchling holder has a cupped seat portion for cupping the ventral-end of a hatchling. The cupped seat portion is apertured, as with an opening. The hatchling is seated on the handheld, hatchling holder such that the cupped seat portion provides support to portions of the hatchling's perineal area that surrounds the alimentary vent (cloaca) as the alimentary vent is situated for exposure by the opening. The holder and opening facilitates not only welfare-friendly discharge of the meconium in the hatchling's alimentary vent through the opening but also welfare-friendly examination of the distended innards of the vent for markers of gender. The quality of the meconium discharge (or absence thereof) also facilitates determining whether the hatchling exceeds a hydration standard or not.

8 Claims, 3 Drawing Sheets

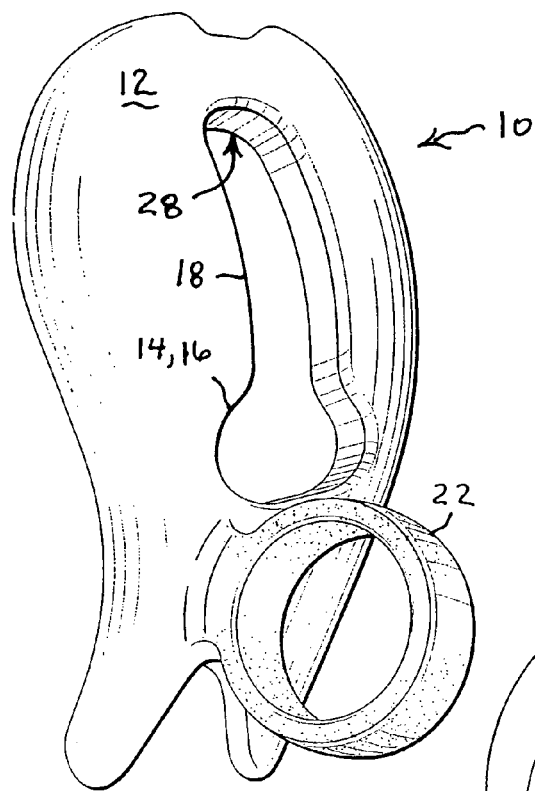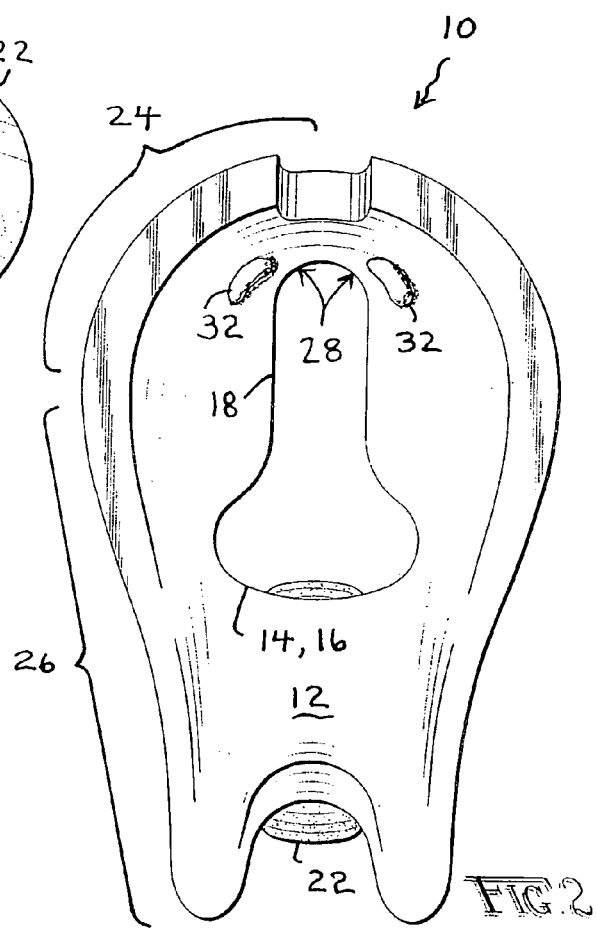

HANDHELD EXAMINATION HOLDER FOR AVIAN HATCHLINGS, AND GENDER EXAMINATION PROCESS

CROSS-REFERENCE TO PROVISIONAL APPLICATION(S)

This application claims the benefit of U.S. Provisional Application No. 60/750,273, filed Dec. 13, 2005, the disclosure of which is incorporated herein by this reference thereto.

This application shares a common inventor and is commonly-owned with co-pending U.S. patent application Ser. No. 11/414,144, filed Apr. 27, 2006, which claims the benefit of U.S. Provisional Application Nos. 60/675,435, filed Apr. 27, 2005; and 60/683,102, filed May 20, 2005, all three which are entitled "Examination Holder for Avian Hatchlings, and Gender Examination Process;" and are incorporated herein by this reference; as well as claims the benefit of the first referenced U.S. Provisional Application above, No. 60/750,273, filed Dec. 13, 2005.

BACKGROUND AND SUMMARY OF THE INVENTION

The invention relates to livestock immobilization apparatus and, more particularly, to a handheld holder for holding an avian hatchling during a gender and/or hydration examination as well as a gender and/or hydration examination process facilitated by such apparatus.

The turkey-rearing industry, among others, is keenly interested in determining the sex of hatchlings as early as possible. Generally hatchlings are raised in separate-sex farms. One reason for separate-sex rearing is that toms (males) get so much larger than hens that at harvest the toms and hens are sent through separate factory-grade process lines specifically scaled for handling the larger or smaller carcasses according to sex.

One current popular practice to determine hatchling sex is to have skilled practitioners manually do so with each hatchling by squeezing the perineal area that surrounds the alimentary vent (or, in more accurate language, the "cloaca") and then rubbing a finger tip over the vent.

In this way, sex is determined based on hatchling anatomy and/or structure that is associated with the hatchling's vent (ie., cloaca). In actual practice, sex determination is reckoned by whether anatomical structure or organs characteristics of males are present or not. If present, then the hatchling is reckoned a male of course. If absent, then the hatchling is presumed a female. The preferred organs or structure for this determination are preferably the male "tokki," which might be reckoned as structure of the phallus.

By way of background, the custom of avian vent-sexing extends back to an early origin with Japanese practitioners who over time refined the practice to a high level of skill. Accordingly, terminology common in the field today shows these Japanese roots, and the particular structure on which to base a manual vent-sexing determination is referred to as "tokki." Presumptively "tokki" corresponds to structure of the phallus. What this structure appears like in turkeys is miniature testes gonads. As an aside, chickens differ from turkeys in that male hatchlings thereof present what appears more like a single ball structure. However, the true avian testes gonads in at least turkey or chicken hatchlings are deeper inside the abdomen than the "tokki" structure searched for by vent-sexing examiners. The "tokki" structure may actually be intermediate sperm reservoirs downline from the true testes gonads. Regardless, this "tokki" structure is found retracted just inside a peripheral portion of the alimentary vent in male avian hatchlings. The presence or absence of the "tokki" structure has been used by vent-sexing examiners successfully for many long years to determine sex of first-day hatchlings, and with a very high degree of accuracy.

Beyond gender determination, the practice of such manual examinations can furthermore be utilized to make a hatchling quality determination, such as hydration and/or deformation issues. That is, the examiner can be making determinations if a hatchling is normally (or sufficiently) hydrated or, in the alternative, problematically dehydrated. Also, the examiner can be making determinations if the hatchling has deformations in vent and/or surrounding perineal area that are unacceptable. Sexors are the only service personnel in the turkey (and/or poultry) industry that identify deformations in this area of the bird's anatomy. Identifying unacceptable deformations in this area of the bird's anatomy is only critical for breeding stock, and birds afflicted with such are culled immediately. The problematically dehydrated birds are typically culled their first day too because they have a low survival rate, and it is more efficient to cull them immediately rather than waste costly resources on them.

The inventors hereof know very well the difference between a healthy, sufficiently hydrated bird and dehydrated bird by manual inspection. Such indicators include the following. Before a hatchling is manually inspected, it is squeezed gently to void its alimentary vent of meconium. In birds, the "meconium" is the first stool or discharge of a hatchling. (Correspondingly, in mammals, meconium is typically a dark greenish mass that accumulates in the bowel during fetal life and is discharged shortly after birth.)

To void the vent of meconium, typically an examiner gently squeezes the hatchling's abdomen while concurrently giving the hatchling a single flick-of-the wrist shake toward the ground, with the hatchling's vent ultimately pointed down. To observers, this is not only a quick one-handed movement but is also appears something like squirting a stream from a rubber syringe, as with both a quick squeeze on the bulb and a flick with the wrist to the ground. Alternatively, the motion might be likened to someone wringing dry a soaking wet sponge ball.

If the hatchling is healthy, a watery squirt of considerable volume is obtained. With dehydrated birds, either no to little meconium comes out, and what does (if any) is chalky and thick.

As an aside, healthy (eg, sufficiently hydrated) hatchlings are typically plump in a worker's grip. Dehydrated birds feel shriveled and bony. Moreover, the legs of the hatchlings provide another tell-tale sign.

Healthy (properly hydrated) hatchlings have healthy legs (which is known to professional practitioners who sex hatchlings by the thousands and thousands each week) in contrast to dehydrated birds, whose legs have a wrinkled texture, like raisins.

In review, the practice of manually determining the sex of a hatchling to date has involved two separate steps of squeezing—gently, hopefully—the hatchling to do so. The first occasion of squeezing the hatchling is undertaken to void the vent of meconium. The second occasion of squeezing the hatchling is practiced to distend slightly the "tokki" structure—which is found retracted just inside a peripheral portion of the alimentary vent in male avian hatchlings—to a distended position protruding slightly outside alimentary vent. Albeit the step of voiding of the vent of meconium does help the examiner make a hydration determination, the primary purpose thereof is simply to allow the examiner to better see and feel whether the "tokki" structure is present or absent.

This second occasion of squeezing the hatchling (ie., to distend slightly the "tokki" structure) is usually practiced with the worker jamming his or her right thumb tip in the perineal area just above the vent (eg., into the gut of the bird), and then pinching the lower perineal area (eg., the rump of the bird) between his or her left thumb and forefinger. Hence, workers manually apply a squeeze by applying pressure at three points surrounding the bird's vent (cloaca). The foregoing allows the examiner to better see and feel whether the "tokki" structure is present or absent.

Suspicions have been forming nowadays that the practice of manually sexing hatchlings is causing harm or premature mortality to the hatchlings. It is feared that the jamming of a thumb nail in the gut of the hatchling is causing unwanted bruising. Worse still, it is known that most unwanted ruptures of the yolk sac are sexing injuries. That is, rupture of the yolk sac is most at risk when the hatchlings are squished and shook to clear meconium from their vents. The problem with the bruising is that it may impair growth or, that is, hatchlings bruised on their first day may not grow to be as heavy. But worse yet is the fate of hatchlings whose yolk sacs are ruptured, because the rupture kills. They die.

What is needed is an improvement for workers in the business of manually determining the gender of hatchlings, or optionally determining quality of hydration as well, which overcomes shortcomings of the prior art way of doing business and is kinder to the hatchlings.

A number of additional features and objects will be apparent in connection with the following discussion of the drawings and preferred embodiment(s) and example(s).

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a handheld, hatchling holder in accordance with the invention to hold an avian hatchling for examination of the vent (or cloaca) by either an examiner or an examining-apparatus in order to make a gender or other determination, including a hydration determination;

FIG. 2 is a perspective view thereof showing the concave seat side thereof, in contrast to FIG. 1 which shows the convex away side thereof;

DETAILED DESCRIPTION OF THE PREFERRED EMBODIMENTS

FIG. 1 shows a handheld device or apparatus 10 in accordance with the invention for holding an avian hatchling during manual examination thereof by an examiner. Example uses of the results of such an examination include without limitation sorting day-old male and female hatchlings apart for rearing separately. Additionally, the results of the examination can furthermore be utilized to make a hatchling quality determination. More particularly, the results can be utilized to determine if a hatchling is normally (or sufficiently) hydrated or, in the alternative, problematically dehydrated. Problematically dehydrated birds are preferably culled their first day because of low survival rate. It is more efficient to cull them early rather than wastep costly resources on them.

Figure 3:
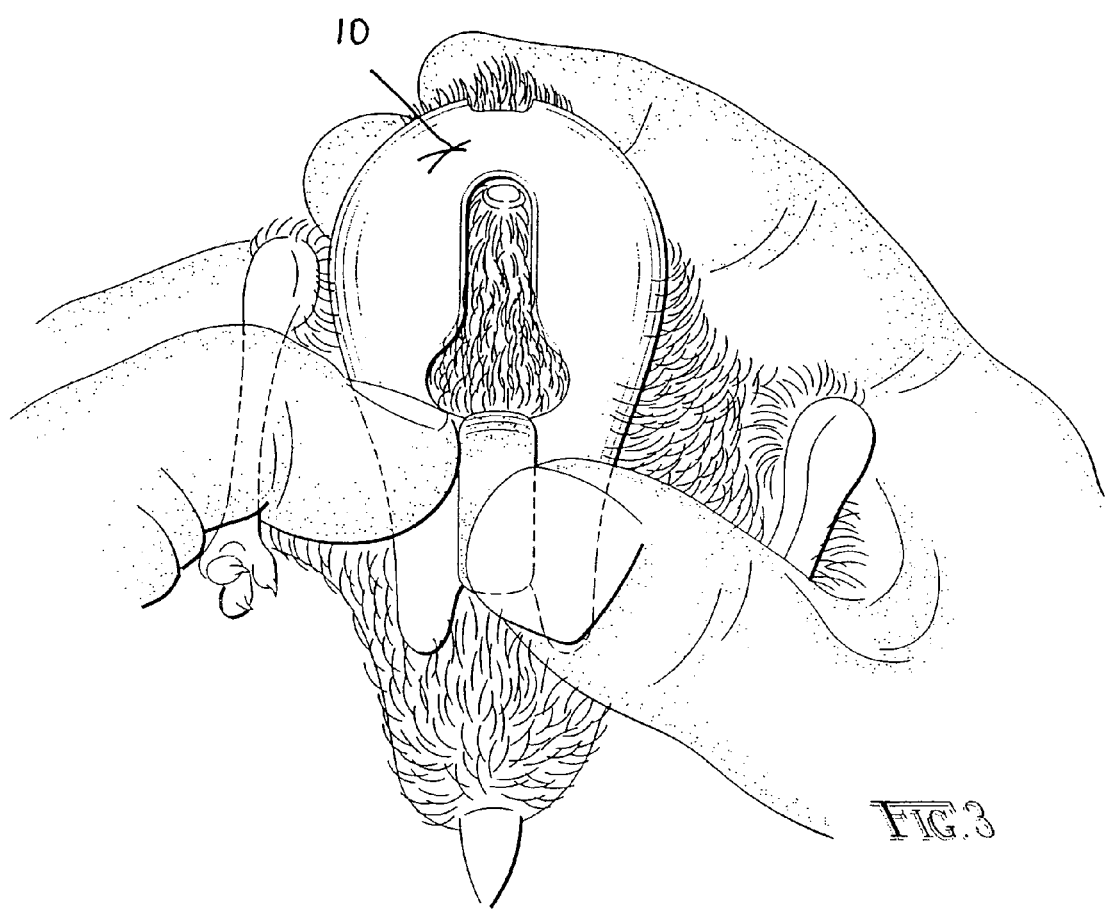
FIG. 3 is a perspective view showing manual use of the handheld hatchling-holder in accordance with the invention, with a subject hatchling undergoing examination.
Figure 4:
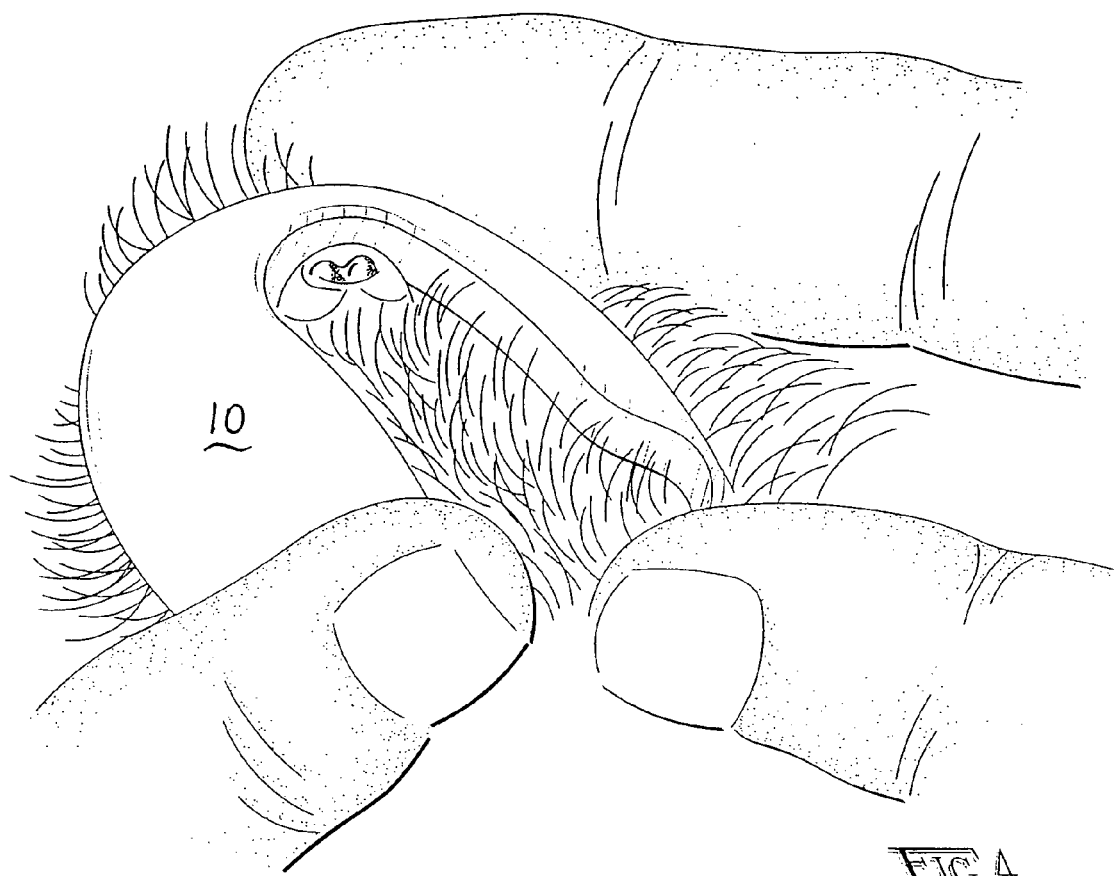
FIG. 4 is an enlarged-scale perspective view comparable to FIG. 3 except enlarged sufficiently to show the double-ball structure comprising the hatchling's tokki (which might be reckoned as structure of the phallus) bulging from the hatchling's vent, which identifies this hatchling as a turkey tom.

As FIGS. 3 and 4 show better, the handheld device (or apparatus) 10 in accordance with invention comprises a hatchling holder. Referring to FIGS. 1 and 2, the handheld hatchling-holder 10 comprises a web 12 of material encircling a 'key-hole' or 'gourd' shaped interior opening 14. The web 12 is not flat but warped. One way to reckon the warp of the web 12 is that it is spoon-shaped, having a convex side (ie., FIG. 1) and counterpart concave side (ie., FIG. 2). Prototypes have been produced out of plastic pipe elbows commonly used in the plumbing industry. Hence the geometry of the web 12 for those prototypes is more accurately described as a spoon-form slice of the outside of a torus (ie., a three-dimensional shape consisting of a ring with a circular cross-section). Further design concepts include what might better be described as spoon-form slices of the outside of a horn (ie., a three-dimensional shape consisting of an arc with a tapering, cylindrically-conic cross-section). Further design concepts include warps of less axial-symmetry as the foregoing and more like the warp of ladles.

FIG. 2 shows the actual seat side of the web 12 upon which the avian hatchling is actually seated. Conversely FIG. 1 shows the convex away side for the web 12. The interior opening 14 is preferably, as mentioned above, preferably key-hole or gourd shaped, and comprises a relatively enlarged bulb end 16 as well as a slot extension 18 which extends from the relatively enlarged bulb end.

FIG. 1 shows that the away side includes a finger or thumb retainer 22 proximate the relatively-enlarged bulb end 16. In FIG. 1, the retainer 22 is depicted as a thumb or finger ring, although other design variations have been prototyped including without limitation a pigtail, or in alternatively terminology a serpentine coil. The retainer 22 simply affords the worker the convenience of wearing the handheld hatchling-holder 10 on a finger or thumb without having to worry about letting it slip out of one's grip. In one preferred embodiment, the retainer 10 is produced of resilient material, such as synthetic or natural rubber, and sized to fit over the knuckle of a worker's thumb. With the foregoing embodiment, it is intended that the handheld hatchling-holder 10 can be worn comfortably for a full work day on a worker's thumb.

As shown better in FIG. 2, inventive handheld hatchling-holder 10 can be reckoned as comprising two distinguishable zones or portions: namely, a cupped seat portion 24 for cupping the tail end of a hatchling (eg., about the upper one-third of the handheld hatchling-holder 10 as oriented in the view) and, in contrast thereto, the lower two-thirds of the handheld hatchling-holder 10, might be reckoned as comprising an abdominal supporting-section 26.

As better shown by FIG. 3, the cupped seat portion 24 is sized so that the avian hatchling's thighs straddle the cupped seat portion 24 in the flared-out position. Returning to FIG. 2, the slot extension 18 of the interior opening 14 terminates in a closed end within the zone of the cupped seat portion 24. More particularly, the slot extension 18's closed end is surrounded by rim, naturally enough. That much of the rim comprises a perineal hoop 28 which is sized to circumferentially-surround a fractional portion of the hatchling's alimentary vent (ie., "cloaca"), and as better shown by FIG. 3 or 4. A preferred configuration of the perineal hoop 28 includes without limitation a semi-circle.

Referencing FIG. 2 once again, the concave seat side of the seat portion 24 includes a ridge formation arcing generally in correspondence with, except spaced minutely outboard from, the perineal hoop 28. This ridge formation comprises a perineal press 32.

Even though the seat side of the seat portion 24 (ie., in view in FIG. 2) is warped, it is generally warped along a smooth surface. In contrast, the formation(s) of the perineal press 32 comprise protrusions out of that smooth warp of the seat portion 24. The purpose behind the perineal press 32 is that the protruding formation(s) thereof apply perineal compression against the hatchling's lower perineal area (eg., the rump of the bird). It is an aspect of the invention, as FIG. 4 shows better, that manually seating a hatchling on the handheld hatchling-holder 10 in accordance with the invention has the perineal press 32 (not in view in FIG. 4) causing the hatchling's vent and accompanying innards to distend through the perineal hoop 28.

The abdominal-supporting portion 26 is arranged and contoured for a generalized abdominal anatomy of a hatchling. That is, this contour includes the following aspects. The abdominal-supporting portion 26 is generally trough-shaped across the lateral span for supporting and stabilizing the breast and belly of a hatchling while arching in the longitudinal span. As stated above, prototypes have been produced out of plastic pipe elbows commonly used in the plumbing industry. Hence the geometry of the abdominal-supporting portion 26 for those prototypes is more accurately described as a spoon-form slice of the outside of a torus (ie., a three-dimensional shape consisting of a ring with a circular cross-section). Further design concepts include what might better be described as spoon-form slices of the outside of a horn (ie., a three-dimensional shape consisting of an arc with a tapering, cylindrically-conic cross-section). Further design concepts include warps of less axial-symmetry as the foregoing and more like the warp of ladles.

FIG. 3 when compared to FIGS. 1 and 2 show that the abdominal-supporting portion 26 contains the enlarged (bulb) end 16 of the interior opening 14, and this can be reckoned as the belly-overflow portion (eg., 16) of the interior opening 14. The belly-overflow portion (eg., 16) of the interior opening 14 allows some of the hatchling's belly squish out during examination. Allowing belly overflow is not so much for pressure relief of the bird's gut as it is for making the tokki extend higher (eg., protrude out more) thereby improving examination accuracy. The closed end of the closed-ended slot extension 18 can be referenced as the perineal hoop 28 because that much of the rim partially surrounds and supports (in part) the perineal area that surrounds the alimentary vent (cloaca) of the bird. FIG. 4 shows the examiner applying light thumb pressure to the retainer 22 and light forefinger pressure to the seat portion 24 to cause the perineal press 32 on the opposite, seat side of the handheld hatchling-holder 10 to press into the belly of the subject hatchling.

Studying FIGS. 2 and 3-4 more closely, it can be seen in FIGS. 3-4 that depressing the retainer 22 and seat portion 24 into the hatchling's abdomen and perineal area (in concert with the examiner holding the dorsal side of the presumptively-struggling hatchling motionless) causes the hatchling's vent and accompanying innards to distend through the perineal hoop 28 of the interior opening 14. This distension is better shown by the enlarged-scale close-up of FIG. 4.

Again, FIG. 4 better shows the results of distension of the vent and accompanying innards. That is, FIG. 4 shows such anatomical structure poking out the distended vent that is representative of a male turkey hatchling. That is, the "tokki" structure is evident. An examiner can either affirm the presence of the "tokki" structure by visual examination alone, or further confirm the presence thereof by lightly rubbing a finger tip across it. In contrast, if such anatomical structure representative of maleness is absent (not shown) then such a hatchling would presumptively be a female. An examiner can confirm the absence thereof by lightly rubbing a finger tip across the vent if the vent seems inadequately distended such that the "tokki" structure might still be buried within the vent.

Given the foregoing, it has been discovered that the handheld hatchling-holder 10 in accordance with the invention provides a twofold benefit in assuring hatchling welfare during the examination process.

That is, to understand the contrast with prior art way of manually examining hatchlings, the prior art way comprised a two-step sequence with two separate occasions of squeezing the hatchling.

To review as described above, the prior art way of manually determining gender of hatchlings involved two separate steps of squeezing—albeit preferably gently, hopefully—the hatchling to do so. The first occasion of squeezing the hatchling is undertaken to void the vent of meconium. The second occasion of squeezing the hatchling is practiced to distend slightly the "tokki" structure—which is found retracted just inside a peripheral portion of the alimentary vent in male avian hatchlings—to a distended position protruding slightly outside alimentary vent. Regardless that the step of voiding of the vent of meconium does help the examiner make a hydration determination, the primary purpose of doing so is simply to allow the examiner to better see and feel whether the "tokki" structure is present or absent.

This second occasion of squeezing the hatchling (ie., to distend slightly the "tokki" structure) is usually practiced with the worker jamming his or her right thumb tip in the perineal area just above the vent (eg., sort of into the gut of the bird), and then pinching the lower perineal area (eg., the rump of the bird) between his or her left thumb and forefinger. Hence, workers manually apply a squeeze by applying pressure at three points surrounding the bird's vent (cloaca). The foregoing allows the examiner to better see and feel whether the "tokki" structure is present or absent.

It is now believed that both occasions of squeezing the hatchling are causes for alarm. Needless to say, the hatchlings are not even a day old. To say the least, they are tender, or like fragile. It is feared that the jamming of a thumb nail in the gut of the hatchling is causing unwanted bruising. Worse still, it is feared that the squishing and shaking of the hatchling to clear meconium is causing unwanted ruptures of the yolk sac. The problem with the bruising is that it impairs growth or, that is, hatchlings bruised on their first day do not grow to be as heavy. But worse yet is the fate of hatchlings whose yolk sacs are ruptured, because the rupture kills. There is no repair for a hatchling whose yolk is ruptured. It dies.

An inventive aspect of utilizing the handheld hatchling-holder 10 in accordance with the invention is that it better protects the welfare of the hatchling during the process of manual examination. It has been discovered that the welfare of the hatchling is advantageously protected if the occasion of voiding meconium from the vent is practiced with the hatchling already seated on the handheld hatchling-holder 10.

Accordingly, in distinction over the prior art, it is preferred if workers examine hatchlings by a procedure which follows the steps given below:— a. seating the hatchling on the handheld hatchling-holder 10 (eg., generally as shown in FIG. 3);

b. gently squeezing, shaking and/or flicking the hatchling while cradled by the holder 10 in order to void meconium from the vent; and then c. manipulating the hatchling as held by the holder 10 in order to make an examination determination.

The foregoing procedure has the dual advantages of lessening/eliminating the chances of rupturing the yolk sac relative to the prior art way of voiding meconium as well as lessening/eliminating the chances of bruising relative the prior art way of pinching the vent to distend the innards.

This application is commonly-owned with commonly-invented U.S. Pat. No. 6,512,839 (B1)—Toelken, entitled "Ultrasound sex determination of avian hatchlings," the full disclosure of which is incorporated by this reference to it.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method for supporting an avian hatchling during examination thereof, comprising: supplying a handheld, hatchling holder that has a cupped seat portion for cupping the ventral-end of a hatchling; which cupped seat portion is formed with an opening; seating a hatchling in the cupped seat portion wherein the cupped seat portion provides support to portions of the hatchling's perineal area that surrounds the alimentary vent as the alimentary vent is set exposed to the opening; discharging the meconium in the hatchling's alimentary vent through the opening; and making at least one examination determination.

2. The method of claim 1 wherein the step of making at least one examination determination comprises making a determination based on the presence, absence or quality of one or more examined markers indicative of gender, deformations, and/or level of hydration.

3. The method of claim 1 wherein the step of discharging the meconium in the hatchling's alimentary vent comprises any one or combination of gently compressing, shaking and/or flicking the hatchling while seated in the holder.

4. The method of claim 3 wherein the step of making at least one examination determination comprises making a determination based on the presence, absence or quality of one or more examined markers indicative of level of hydration such that if the step of discharging produces a watery squirt of considerable volume then the hatchling is passed on to rearing operations, in contrast to, if the step of discharging produces either no to little meconium to come out, and if what does (if any) comes out is chalky and thick, then the hatchling is culled.

5. The method of claim 1 wherein the step of making at least one examination determination includes the activity of examining the hatchling's alimentary vent through said opening and then making a determination based the presence, absence or quality of one or more examined markers indicative of gender.

6. The method of claim 5 the step of making at least one examination determination furthermore comprises a preliminary step of compressing the hatchling and holder to cause the hatchling's alimentary vent and proximal innards to distend through the opening.

7. The method of claim 1 further comprising: acquiring at least two output streams of hatchlings sorted apart for at least two different subsequent dispositions relative to an initial input of a plurality of unsorted hatchlings.

8. The method of claim 1 wherein one of the at least two output streams subsequent disposition is cull and the other's is pass to rearing operations or else the one's subsequent disposition is pass to male-gender only rearing operations and the other's is pass to female-gender only rearing operations.

* * * * *